United States Patent
Wang

(10) Patent No.: US 9,268,083 B1
(45) Date of Patent: Feb. 23, 2016

(54) FLASHING BROOCH

(71) Applicant: Hua-Cheng Pan, Tainan (TW)

(72) Inventor: Chih-Liang Wang, Tainan (TW)

(73) Assignee: Hua-Cheng Pan, Tainan (TW)

( * ) Notice: Subject to any disclaimer, the term of this patent is extended or adjusted under 35 U.S.C. 154(b) by 21 days.

(21) Appl. No.: 14/463,649

(22) Filed: Aug. 19, 2014

(51) Int. Cl.
*F21V 8/00* (2006.01)
*F21V 33/00* (2006.01)
*A44C 15/00* (2006.01)
*F21W 121/06* (2006.01)

(52) U.S. Cl.
CPC .......... *G02B 6/0083* (2013.01); *A44C 15/0015* (2013.01); *F21V 33/0008* (2013.01); *G02B 6/0035* (2013.01); *G02B 6/0076* (2013.01); *F21W 2121/06* (2013.01)

(58) Field of Classification Search
CPC ........... A44C 15/0015; A44B 11/2565; G02B 6/0083; G02B 6/0076; G02B 33/0008; F21V 33/0008; F21W 2121/06
USPC .................. 362/104, 602, 605, 565, 571, 570
See application file for complete search history.

(56) References Cited

U.S. PATENT DOCUMENTS

| | | | | |
|---|---|---|---|---|
| 5,576,078 A * | 11/1996 | Schatz | ............... | A47G 33/08 362/605 |
| 5,755,506 A * | 5/1998 | Ray | ............... | A44C 15/0015 362/103 |
| 6,615,520 B2 * | 9/2003 | Landers, Jr. | ......... | G02B 6/0065 40/1.5 |
| 6,748,681 B1 * | 6/2004 | Dorney | ............... | A44C 3/001 362/34 |
| 7,055,755 B2 * | 6/2006 | Clegg | ............... | G06K 19/04 235/375 |
| 7,360,926 B2 * | 4/2008 | Lee | ............... | A44C 15/0015 362/104 |
| 7,566,140 B2 * | 7/2009 | Sevilla | ............... | A44B 11/001 362/103 |
| 2003/0189820 A1 * | 10/2003 | Tell | ............... | G02B 6/0021 362/602 |

* cited by examiner

Primary Examiner — Laura Tso
(74) Attorney, Agent, or Firm — Leong C. Lei

(57) ABSTRACT

A flashing brooch includes: a fastener to be attached to a fabric, a base, a circuit module, and a light guide unit. The light guide unit includes two light spreader plates that are parallel to each other and are mounted to one side of the fastener. The circuit module includes a light-emitting element corresponding to each of the light spreader plates and a control circuit that controls each of the light-emitting elements to get lightening and darkening in a given sequence and further includes a power switch that activates/de-activates the supply of electricity. As such, when each of the light-emitting elements get lightening and darkening in sequence, the light spreader plate corresponding thereto shows an effect of light flashing in response thereto to thereby improve decoration of the brooch.

6 Claims, 6 Drawing Sheets

FLASHING BROOCH

(a) TECHNICAL FIELD OF THE INVENTION

The present invention generally relates to a brooch, and more particularly to a structure of a brooch that provides a flashing effect.

(b) DESCRIPTION OF THE PRIOR ART

A brooch is a piece of decoration that is generally attached to a garment for decorative purposes and may also be positioned on an exhibition frame as a piece of fine art to serve as a decoration of observation.

A conventional brooch structure comprises a pin and a decorative article. The decorative article has a bottom that is attached by hot-melt adhesive to one side of the pin. Such an arrangement provides an effect of decoration when worn by a user.

However, the conventional brooches have structures that are similar without significant variation or change. Most of the conventional brooches are of static designs, making them very boring and monotonous. Thus, it is an important issue to provide a brooch that includes an innovated design to improve the value and the style thereof.

SUMMARY OF THE INVENTION

An object of the present invention is to provide a brooch with a flashing effect, which comprises a design with an innovated structure to improve market competition power of a product thereof.

Thus, the present invention provides a flashing brooch, which comprises:
- a fastener, which is adapted to attach to a fabric;
- a base, which has an interior that is hollow and comprises an opening formed in one end thereof and communicating with the hollow interior and a mounting hole formed in an end thereof that is opposite to the opening;
- a circuit module, which is arranged in the interior of the base and closes the opening, the circuit module comprising at least two spaced light-emitting elements and a control circuit that controls each of the light-emitting elements to lighten and darken in a sequence, the circuit module being adapted to connect to a power supply to receive electricity therefrom for driving each of the light-emitting elements and comprising a power switch that selectively conducts on or cut off the electricity supplied from the electrical supply, the power switch being electrically connected to the control circuit; and
- a light guide unit, which comprises at least two light spreader plates that are arranged to be parallel to each other and coupled to one side of the fastener, each of the light spreader plates comprising a light-transmitting plate having a predetermined thickness and configuration and comprising a light incidence section, each of the light incidence sections being fixed in the mounting hole and located above a corresponding one of the light-emitting elements to receive light to enter the light spreader plates.

As such, when the power supply is conducted on, each of the light-emitting elements gets lightening and darkening in a given sequence and lights pass through the light incidence sections into the interiors of the light spreader plates so that the light spreader plates show a flashing effect in response to the lightening and darkening of the light-emitting elements.

With the above-described technical solution, the problems of the conventional power generation devices that the conditions for installation thereof are severe, they are readily susceptible to influence by weather, they are easily damaged and get quick deterioration, they cannot maintain long term power generation operations, and the economic benefit is low can be overcome and the above-mentioned advantages can be achieved.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
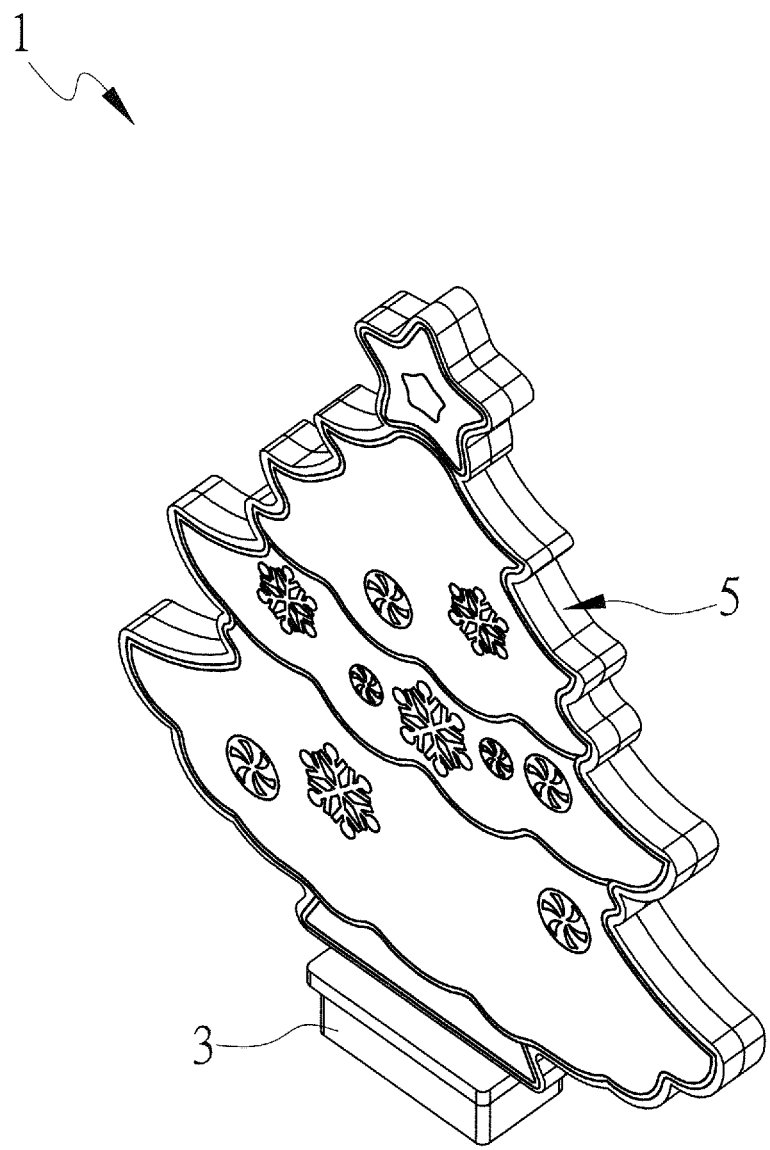
FIG. 1 is a perspective view showing the present invention in an assembled form.
Figure 2:
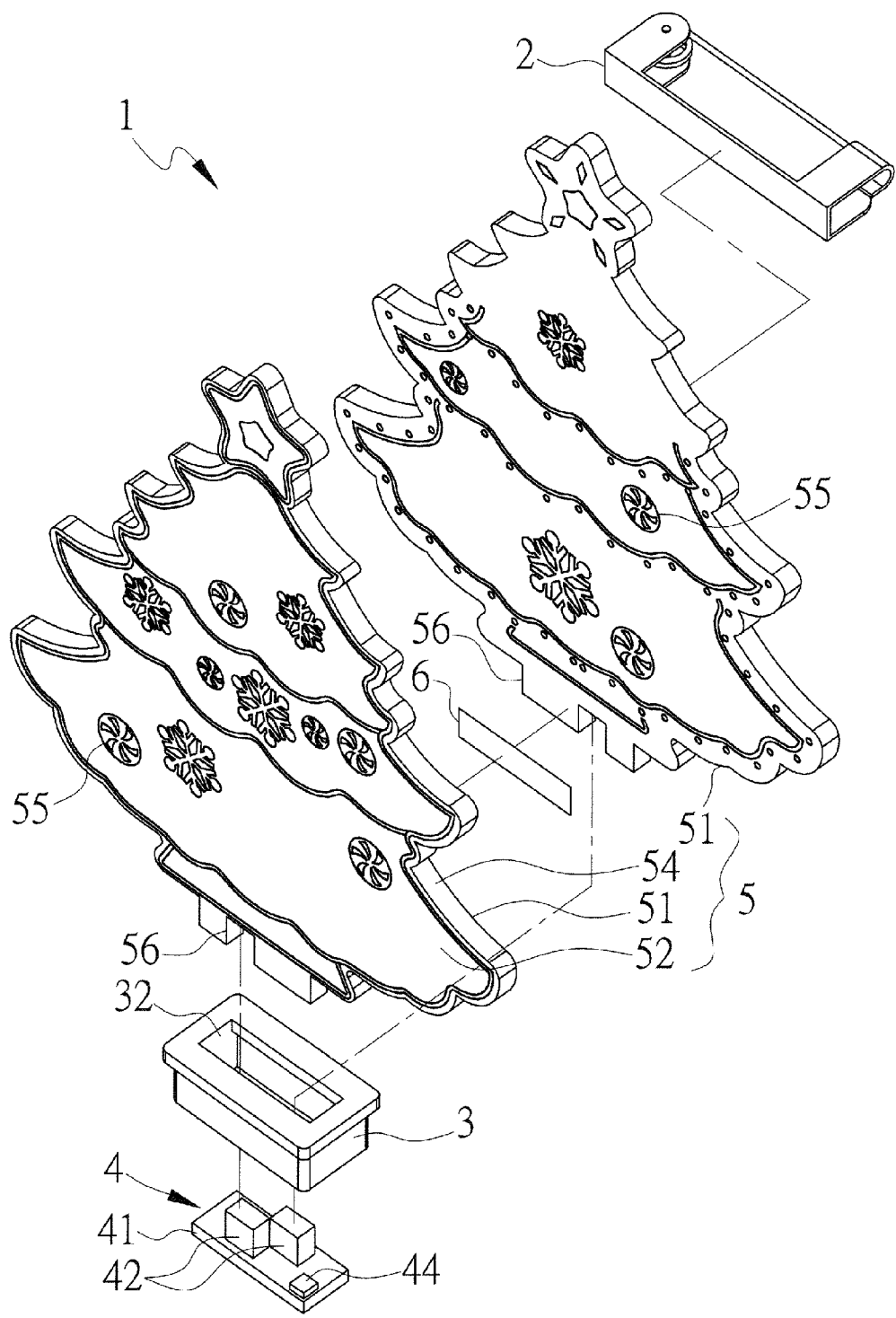
FIG. 2 is an exploded view of the present invention.
Figure 3:
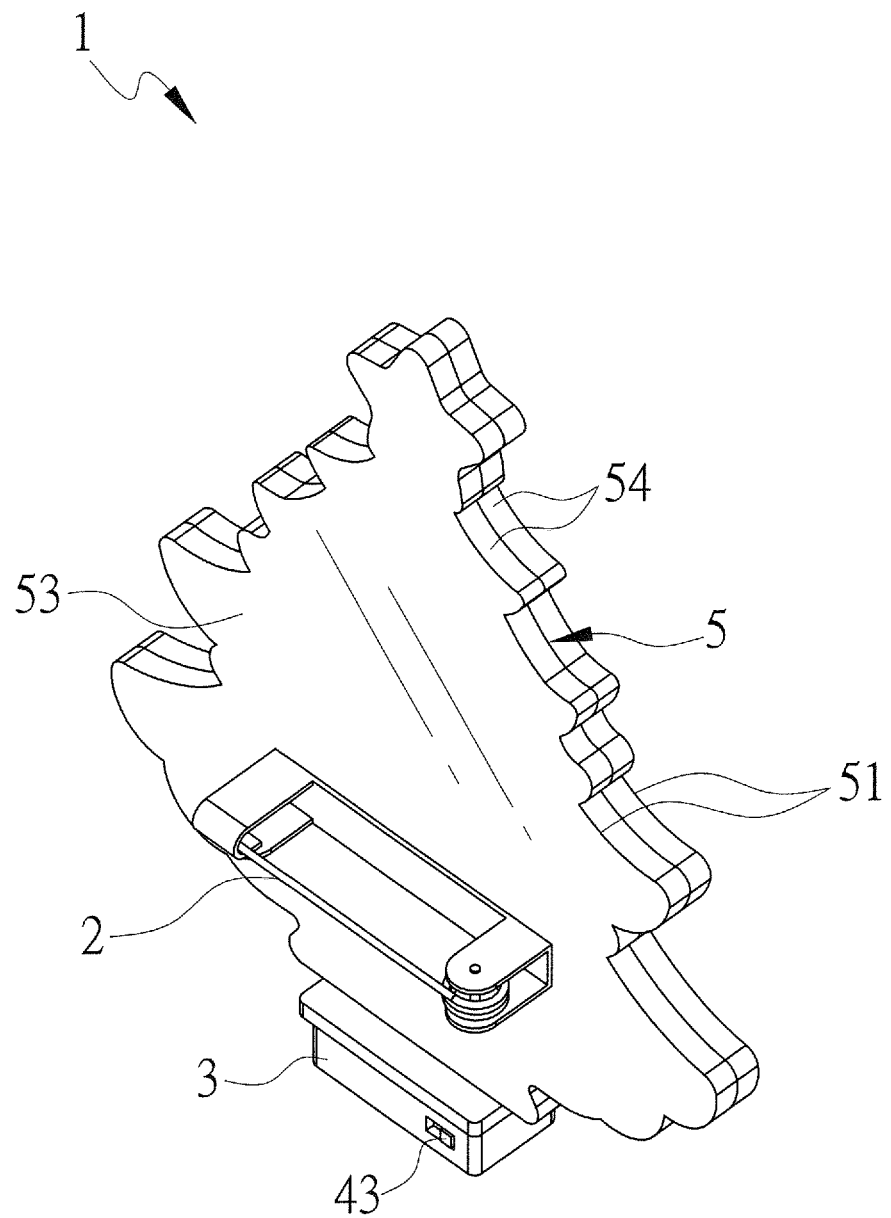
FIG. 3 is a perspective view of the present invention taken from the rear side.

Referring to FIGS. 1-3, a flashing brooch (1) according to the present invention generally comprises: a fastener (2), a base (3), a circuit module (4), and a light guide unit (5), wherein:
- the fastener (2) comprises a clothes pin that is attachable to a piece of fabric;
- the base (3) has an interior that is hollow and comprises an opening (31) formed in an end thereof and communicating with the hollow interior and a mounting hole (32) formed in an end thereof opposite to the opening (31);
- the circuit module (4) is arranged in the interior of the base (3) and closes the opening (31) and the circuit module (4) comprises a control circuit (41) electrically connectable to a power supply (such as a battery) to receive electricity therefrom and at least two light-emitting elements (42) that are spaced from each other and electrically connected to the control circuit (41) to be controlled by the control circuit (41) to lighten, darken, and change colors in any desired order, wherein, in the instant embodiment, the light-emitting elements (42)

comprises light-emitting diodes, which project lights toward the mounting hole (32) and the number of the light-emitting elements (42) is not subject to any constraint and can be increased if desired; and, further, the circuit module (4) comprises the power switch (43) for selectively conducting on and/or cutting off the supply of electricity, the power switch (43) being electrically connected to the control circuit (41); and the light guide unit (5) comprises at least two light spreader plates (51), which are arranged to be parallel to each other and coupled to one side of the fastener (2), the coupling being achieved through adhesives, screwing, magnetic attraction, and the likes, of which the arrangement of the coupling can be of various types and configurations, which constitute no novel part of the present invention so that no further detail will be given herein; and each of the light spreader plates (51) comprises a light-transmitting plate having a predetermined thickness and configuration, wherein, in the instant embodiment, the light spreader plates (51) are configured as a Christmas tree, but their configuration is not limited to such a shape, and each of the light spreader plates (51) has a front surface (52) and a rear surface (53) that are spaced from each other and a side surface (54) connected between circumferences of the front surface (52) and the rear surface (53), wherein the front surface (52) comprises patterns (55) formed thereon and the patterns (55) of the two light spreader plates (51) are arranged to alternate each other, the rear surface (53) of one of the light spreader plates (51) being coupled to the fastener (2).

Figure 4:
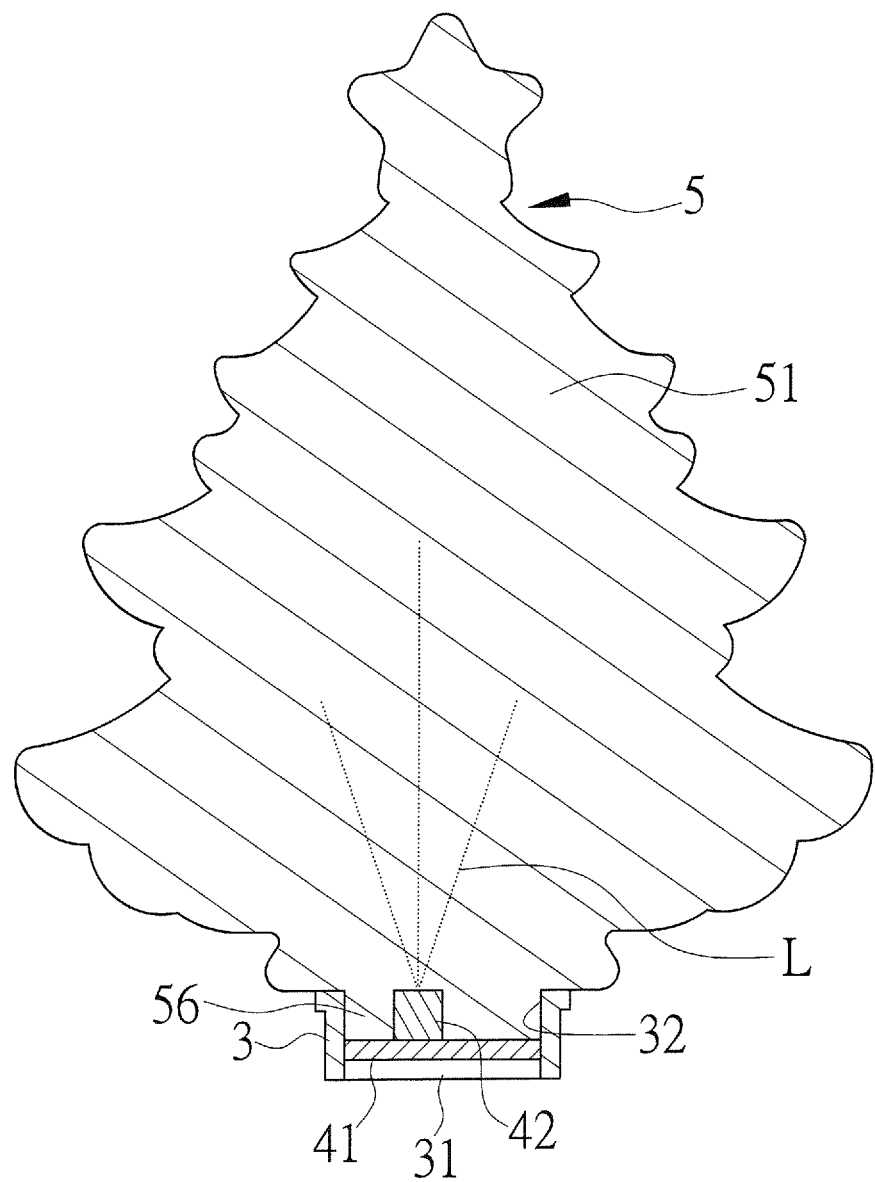
FIG. 4 is a cross-sectional view of the present invention.
Figure 5:
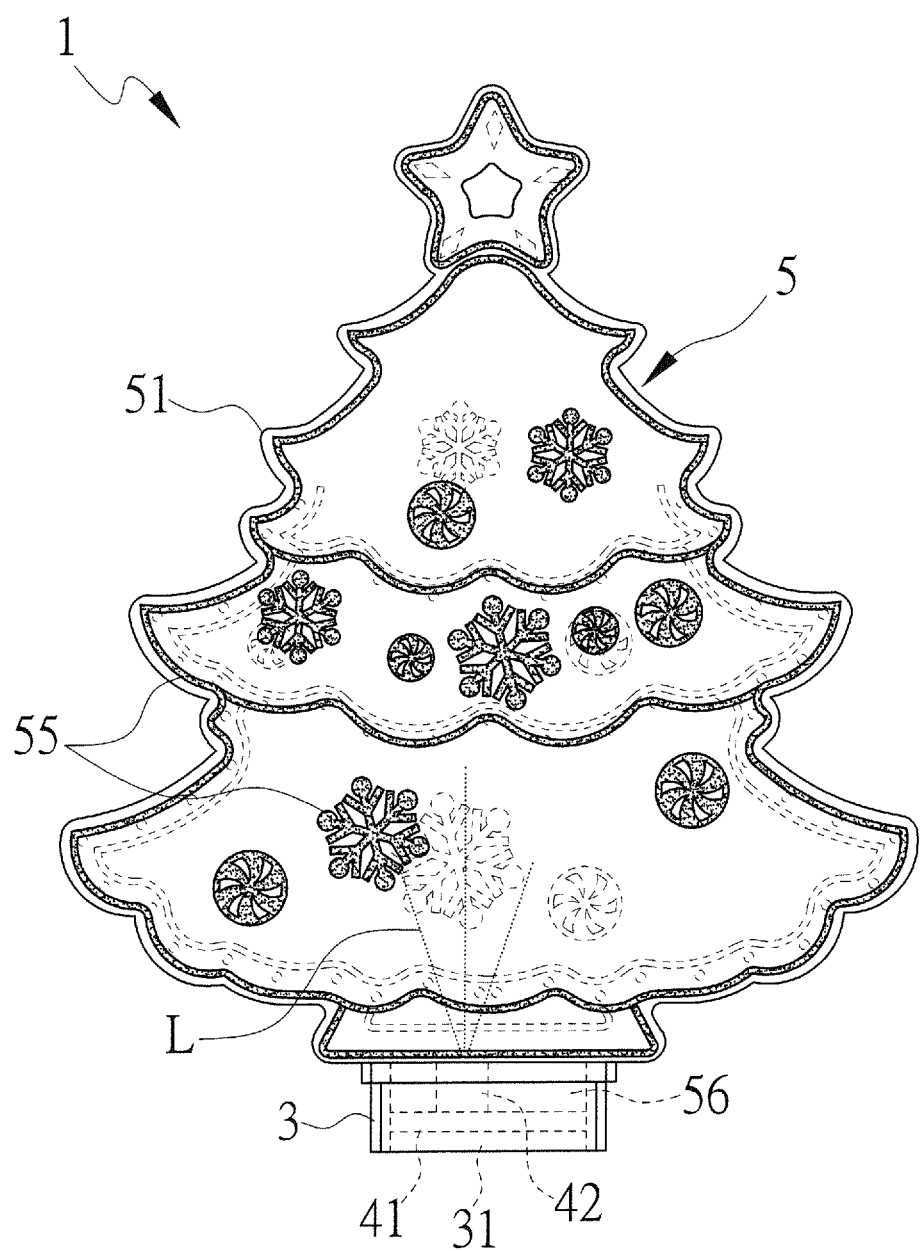
FIGS. 5 and 6 are schematic views showing the present invention in flashing conditions.
Figure 6:
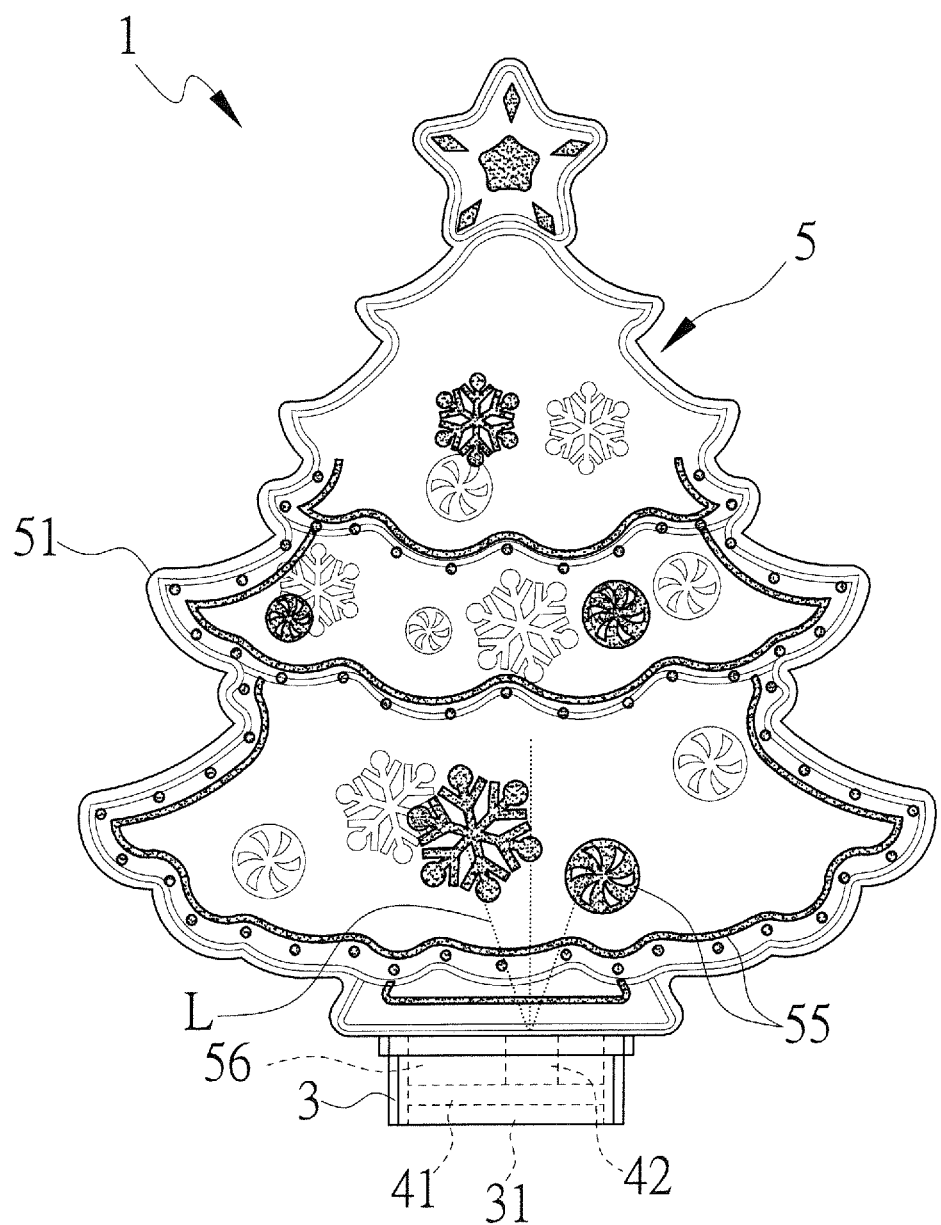

Referring to FIGS. 4-6, the side surface (54) of each of the light spreader plates (51) comprises a light incidence section (56) integrally extending therefrom and is fixed to the mounting hole (32) with the light incidence section (56) to be located above the corresponding one of the light-emitting elements (42) to receive light (L) to transmit into the light spreader plate (51). A light shield plate (6) is arranged between the two light incidence sections (56). The light shield plate (6) is made of a non-light-transmitting material and functions to block the lights (L) of the light-emitting elements (42) from entering the adjacent light spreader plates (51).

The material that is available for making the light spreader plates (51) can be any light-transmitting material, such as glass and plastics. Colorant may be added in the material during the manufacturing process to achieve color variation of the light spreader plates (51). Further, the patterns (55) of the light spreader plates (51) may include various types of patterns, such as figures, marks, and trademarks, which can be formed through printing or engraving.

Further, the circuit module (4) may additionally comprise a shake switch (44). The shake switch (44) is electrically connected between the control circuit (41) and the power switch (43). When the power switch (43) is activated in a normal condition, the shake switch (44) may control conduction or cut-off of the power supply and the control may be such that when it detects shake or vibration, the supply of electricity is conducted on and when the present invention is set in a still condition, the supply of electricity is cut off. Thus, when the present invention is attached to a garment or a backpack, the power switch (43) may be set in an activated condition so that when shake occurs due to walking, the light-emitting elements (42) may be driven to show a flashing effect of lightening, darkening, and intermittently lightening and darkening in a desired sequence. The patterns (55) formed on the surfaces of the light spreader plates (51) may get more prominent by being irradiated by the light (L).

In summary, compared to the conventional brooches, the present invention possesses the following advantages:
(1) The present invention provides light-emitting elements that can be operated to show a flashing effect of lightening and darkening in a predetermined sequence and also to change color to expand the variability thereof
(2) The present invention provides light spreader plates, which can be added with colorants during the manufacture thereof, which, in combination with the alternating arrangement of surface patterns and irradiation of lights from light-emitting elements, greatly upgrade the visual effect of the present invention.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A flashing brooch, comprising:
   a fastener, which is adapted to attach to a fabric;
   a base, which has an interior that is hollow and comprises an opening formed in one end thereof and communicating with the hollow interior and a mounting hole formed in an end thereof that is opposite to the opening;
   a circuit module, which is arranged in the interior of the base and closes the opening, the circuit module comprising at least two spaced light-emitting elements and a control circuit that controls each of the light-emitting elements to lighten and darken in a sequence, the circuit module being adapted to connect to a power supply to receive electricity therefrom for driving each of the light-emitting elements and comprising a power switch that selectively conducts on or cut off the electricity supplied from the electrical supply, the power switch being electrically connected to the control circuit; and
   a light guide unit, which comprises at least two light spreader plates that are arranged to be parallel to each other and coupled to one side of the fastener, each of the light spreader plates comprising a light-transmitting plate having a predetermined thickness and configuration and comprising a light incidence section, each of the light incidence sections being fixed in the mounting hole and located above a corresponding one of the light-emitting elements to receive light to enter the light spreader plates.

2. The flashing brooch according to claim 1, wherein each of the light spreader plates has a surface on which patterns are formed.

3. The flashing brooch according to claim 1, wherein the circuit module further comprises a shake switch, the shake switch being electrically connected between the control circuit and the power switch.

4. The flashing brooch according to claim 1, wherein each of the light-emitting elements is controllable by the control circuit to change color of light.

5. The flashing brooch according to claim 1, wherein each of the light spreader plates comprises a light-transmitting plate having a predetermined color.

6. The flashing brooch according to claim 1, wherein the two light incidence sections comprise a light shield plate arranged therebetween.

\* \* \* \* \*